United States Patent [19]
Tung et al.

[11] Patent Number: 5,218,020
[45] Date of Patent: Jun. 8, 1993

[54] CHITOSAN REINFORCED TIRES AND METHOD OF INCORPORATING CHITOSAN INTO AN ELASTOMER

[75] Inventors: Deborah A. Tung, Tallmadge; Richard G. Bauer, Kent, both of Ohio

[73] Assignee: The Goodyear Tire & Rubber Company, Akron, Ohio

[21] Appl. No.: 834,961

[22] Filed: Feb. 12, 1992

[51] Int. Cl.$^5$ ............................................. C08L 5/08
[52] U.S. Cl. ........................................ 524/55; 524/56; 524/57; 524/58
[58] Field of Search ................ 524/55, 56, 57, 58, 524/495, 496, 847

[56] References Cited

U.S. PATENT DOCUMENTS

| | | | |
|---|---|---|---|
| 4,952,618 | 8/1990 | Olsen | 524/55 |
| 4,978,537 | 12/1990 | Sons | 426/548 |
| 4,990,339 | 2/1991 | Scholl et al. | 523/111 |

*Primary Examiner*—Paul R. Michl
*Assistant Examiner*—Peter Szekely
*Attorney, Agent, or Firm*—David E. Wheeler

[57] ABSTRACT

The invention relates to elastomers and articles reinforced with 5 to 30 phr Chitosan particles having a diameter of 0.5 to 75 microns. In an illustrated embodiment, the Chitosan may be modified with an oxygen reactive group or a nitrogen reactive group to make the Chitosan more reactive with an elastomer. Also provided is an economical method of incorporating very fine Chitosan particles into an elastomer matrix. In the method Chitosan is dissolved in an acid and mixed with a coagulating liquid (for coagulating latex), and the mixture of chitosan/coagulating liquid is mixed with a latex solution to provide an elastomer/chitosan composite. The elastomer/chitosan composite may be used as formed or it can be used as a masterbatch and mixed with more elastomer.

16 Claims, 3 Drawing Sheets

CHITOSAN REINFORCED TIRES AND METHOD OF INCORPORATING CHITOSAN INTO AN ELASTOMER

BACKGROUND OF THE INVENTION

The invention relates to a method of incorporating chitosan reinforcement into an elastomer and elastomeric articles using Chitosan reinforcement.

Chitin is an abundant biopolymer with high potential reactivity and low density. It is obtained commercially as a shell fish by-product, and is potentially a very economical material.

The structure of chitin is similar to that of cellulose, which is commercially used as a reinforcing material (rayon) for rubber in Europe.

The crude material contains calcium carbonate, which is a known reinforcing material for the rubber industry.

Chitosan is a chemical derivative of chitin (a long unbranched polysaccharide (2-acetylamino-2-deoxy glucose)) and is readily prepared in the laboratory by deacetylation of the amino group (using a base or microbial fermentation) on the sugar ring to give a free amine. The reaction can be depicted as follows:

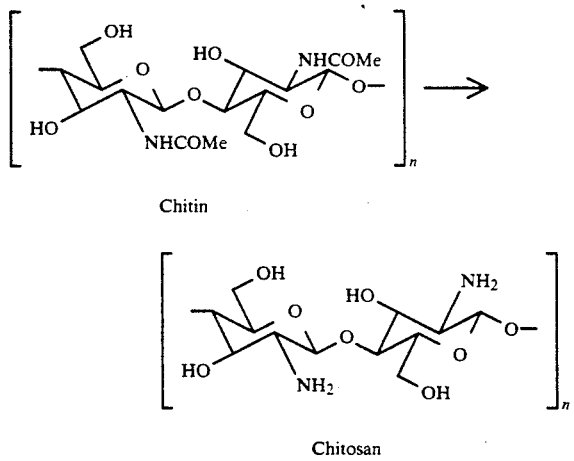

Chitin

Chitosan

This process makes the polymer more reactive and also yields a water soluble material. Chitosan is a linear polyelectrolyte with a high positive charge density at acidic pH. Chitosan is an excellent flocculent and adheres to negatively charged surfaces by way of the ammonium ion ($-NH_3+$). It also chelates a variety of metal ions (Fe, Cd, Hg, Pb, Cr, Ni). This biopolymer has good biological activity, and has been found useful for wound healing, in reduction of cholesterol levels in blood, and as an immune system stimulant. Chitosan has been used in cosmetics for hair treatment and in skin care. In the food industry, it has application as a fruit preservative as a spray, due to its excellent barrier properties.

In early experiments by the present inventors, Chitosan polymers, when blended with elastomers in the solid state, provided improvement in some low strain physical properties in cured rubber. The data showed a trend toward a decrease in physical properties with an increase in the particle size of the chitosan. However, commercial sources for grinding the material below 10 microns proved costly and were not feasible.

Japanese patent application 63-74073, filed Mar. 28, 1988, teaches the use of specialized equipment to pulverize chitin to obtain 0.5–40 micron particles for use in rubber reinforcement.

It is an object of the present invention to provide a unique, economical approach to obtain a reinforced elastomer having a tight range of smaller size chitosan particles by blending a chitosan solution with an elastomer latex. This technique eliminates the need for expensive equipment for reducing the chitosan particle size.

Other objects of the invention will be apparent from the following description and claims.

SUMMARY OF THE INVENTION

Reinforced elastomeric articles and a method for preparing a reinforced elastomer are provided.

The reinforced articles comprise an elastomeric matrix containing 5 to 30 phr chitosan having a diameter of 0.5 to 75 microns.

Also provided are reinforced articles where the chitosan reinforcement is chemically modified.

In specific embodiments, the chitosan and modified chitosan reinforcement can be used in elastomeric components of tires.

A method of mixing chitosan into an elastomer is also provided. The method comprises dissolving the chitosan in an acid, preparing a latex solution of an elastomer and preparing a coagulating solution, mixing the chitosan/acid solution with the coagulating solution, and mixing the latex with the coagulating solution, and isolating precipitated chitosan/rubber. The chitosan/rubber precipitate may be used as formed or it may be mixed with more elastomer using conventional means.

DETAILED DESCRIPTION OF THE INVENTION

Figure 1:
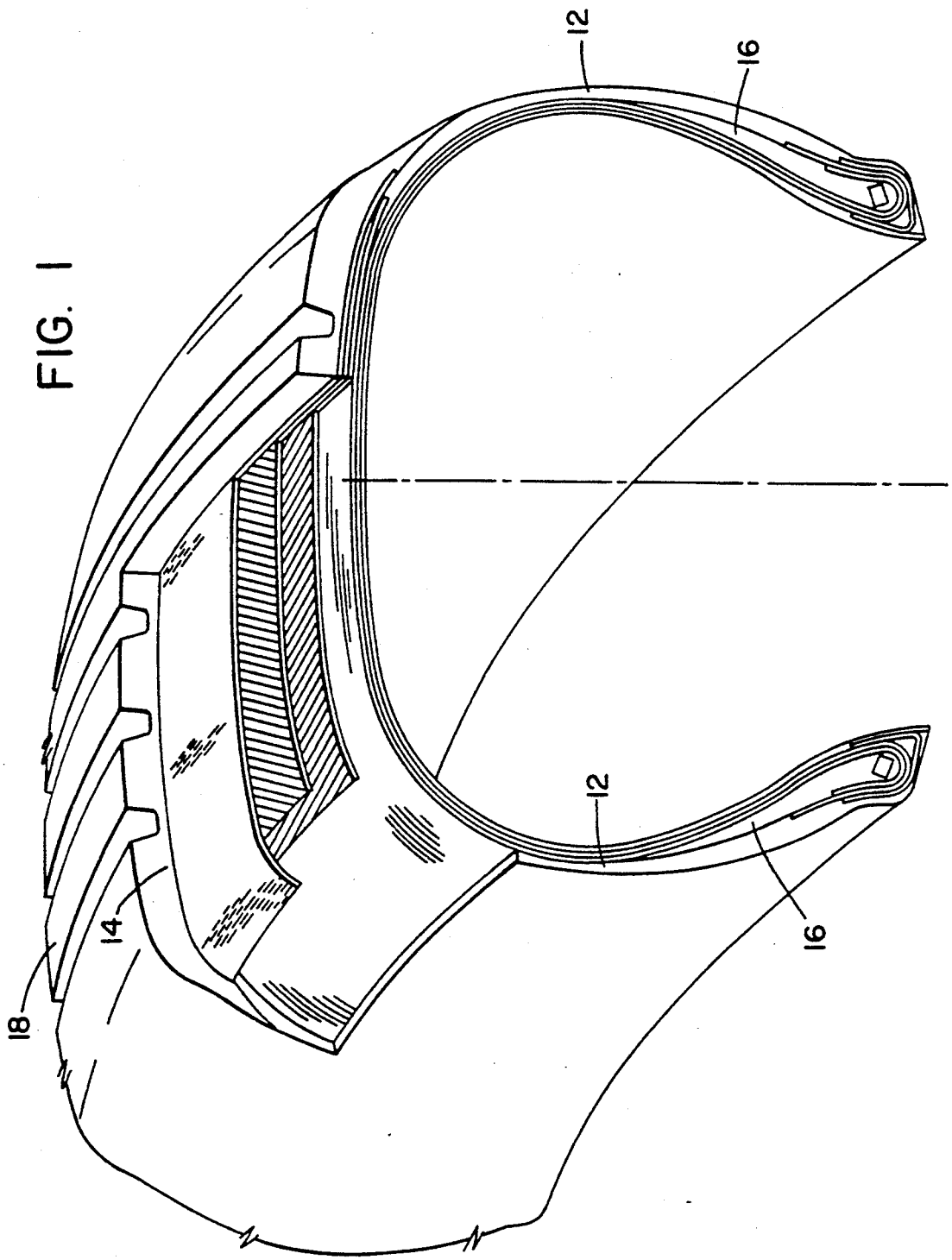
FIG. 1 illustrates a tire which can be made using the reinforced elastomer of the invention.

A purpose of the invention is to use low density chitosan having a particle size of 0.5 to 75 microns, preferably 0.5 to 15 microns, as a reactive filler for tire elastomers using solid state and latex blending. The crystalline nature of chitosan provides strength and stiffness to the elastomer composites.

Chitosan can be easily ground to a particle size of 75 microns or less in a form that is suitable for incorporation in rubber.

Chitosan is a lower density material than carbon black (specific gravity of 1.3 vs. 1.8) which would be advantageous in reducing the material weight in a tire.

In the method of the invention, chitosan may be incorporated into elastomer in a latex solution. In the method, Chitosan may be first dissolved in an acidic solution pH 1 to pH 6, preferably pH 3.5 to pH 6. Any acid that does not react substantially with the chitosan can be used in the solution, but it is preferred that the acid be a mineral acid or an organic acid selected from the group comprising HCl, HNO₃, H₂CO₃, H₂SO₄, acetic acid, and formic acid.

After the Chitosan is dissolved, the chitosan solution can be mixed with a conventional coagulating solution (for coagulating latex) to form a chitosan containing coagulating solution. Any conventional, slightly acidic (so that chitosan does not precipitate), coagulating solution can be used. An exemplary coagulating solution contains NaCl, Al$_2$(SO$_4$)$_3$ and an alkyl ammonium quaternary salt.

An elastomer latex, which is prepared separately, may be mixed with the chitosan containing coagulating solution to incorporate chitosan into the elastomer as the elastomer coagulates. In a preferred embodiment, the latex may be dripped into the coagulating solution. Since the chitosan is dilute as compared to the elastomer in the latex drops, a very fine chitosan particle size is assured.

The coagulated elastomer, containing chitosan, is collected and can be used as a master batch which can be further mixed with more of the same elastomer or with another elastomer, using conventional mixing, to provide a chitosan loading in the elastomer; or the chitosan reinforced elastomer may be used, as formed, in the preparation of elastomeric articles.

Using this method, it has been found that particles in the range of 0.5 to 15 microns, with a mean particle size of 3 to 4 microns, can be obtained relatively easily and without the use of cumbersome and expensive grinding equipment. As previous data has indicated, it appears that with a smaller chitosan particle size, better elastomer properties are obtained in a reinforced elastomer.

In an additional embodiment of the invention, chitosan can be modified with nitrogen or oxygen reactive groups to provide further reactive sites that make possible a chemical reaction (tie, graft) between chitosan and the elastomer. It is believed that additional cross-linking between the filler (chitosan) and the elastomer further improves the modulus of the elastomer composite. Nitrogen or oxygen modifiers that have carbon-carbon unsaturation are particularly reactive, or available for cross-linking, in sulfur or peroxide cure systems in elastomers.

Examples of nitrogen reactive groups that may be used to modify chitosan include aliphatic and aromatic acids, isocyanates, and epoxides.

Examples of oxygen-reactive groups that can be used include isocyanates, acid anhydrides, alkyl halides, amino acids, peptides, epoxides, nitric acid (to nitrate), chlorosulfonic acid (to make the sulfate), and phosphoric acid (to make the phosphate).

Other such functional groups will be apparent to those skilled in the art.

Chitosan reinforced elastomers can be used at a loading of 5 to 30 phr to make reinforced elastomeric articles such as automotive belts, hoses and tires. Other types of articles in which the reinforced elastomer can be used will be apparent to those skilled in the art.

In a preferred embodiment, the chitosan reinforced elastomer can be used as a reinforced tire component having improved stress/strain properties. In an embodiment where chitosan reinforcement is used in place of carbon black reinforcement, the tire component has reduced hysteresis while the modulus and other properties are maintained at a high level. Chitosan reinforced composites also have reduced hysteresis as compared to their chitin reinforced counterparts.

With reference to FIG. 1, tire components in which a chitosan reinforced elastomer can be used include the sidewall 12 (to improve scuff resistance and cracking resistance), the tread base 14 (to help prevent belt ply separation), the apex 16 (to stiffen the lower sidewall), and the tread 18 (to improve treadwear and prevent chipping and chunking). Other uses of the reinforced elastomer will be apparent to those skilled in the art.

The invention is further illustrated with reference to the following examples.

EXAMPLE 1

Chitosan as Adjunct Filler with Carbon Black

Commercial chitin was ground in a Wiley mill using dry ice to obtain a particle size of less than 75 microns. The chitin was deacetylated by stirring with base (NaOH, 40%) for two hours at 140° C. IR analysis provided a spectrum comparable to commercial chitosan.

The prepared chitosan was added at 15 phr to a model compound in addition to the normal carbon black loading (45phr). Chitosan and natural rubber were premixed in a microprocessor-equipped laboratory Brabender (150° C., 6 min) and then this chitosan loaded polymer was used in the compound described as follows.

| Model Formulation | | |
|---|---|---|
| Ingredient | Type | Amount in phr |
| 1. cis, 1, 4-poly-isoprene/chitosan | elastomer/filler | 100/15 |
| 2. carbon black, general purpose tread | filler | 45 |
| 3. petroleum process oil | plasticizer | 9 |
| 4. N-phenyl-N'-(1, 3 dimethyl/butyl) N-phenyl-P phenylenediamine | antidegradant | 2 |
| 5. mixed diaryl-P-phenylene diamine | antidegradant | 1 |
| 6. paraffinic/micro | processing aid | 1 |
| 7. stearic acid | activator | 3 |

For the purposes of this description, the elastomer used to bind the chitosan in the latex is considered insignificant and is not represented in the formula.

Brabender Mixer Compounding

A Brabender mix at 70 rpm using 120° C. oil bath, was used for non-productives (ingredients 1-7). Mix time was 5 minutes, and the drop temperature was approximately 270° F.

The non-productive mixes were used for further compounding by reloading the non-productives in the mixer and adding the following ingredients:

| 8. sulfur | curative | 1.6 |
|---|---|---|
| 9. N, N' diphenyl guanidine | accelerator | 0.4 |
| 10. 2 (morpholino-thio) benzenethiazole | accelerator | 0.8 |
| 11. Zinc oxide | accelerator | 3 |

Productive mixes (non-productive plus the accelerators and vulcanizing agents, (ingredients 8-11) were carried out without external heating at 50 rpm for 3 minutes. The compounded elastomers were cured at 150° C. The vulcanizate physical properties of the reinforced elastomer were compared to that of a control compound comprising the above formulation prepared without the addition of a fiber reinforcement.

The compound of the invention was tested and compared with a control (rubber without the chitosan reinforcement).

Some of the data is shown below.

| Elongation (Instron test) | % Tensile Moduli Improvement Compared to the Control |
|---|---|
| at 50% Elongation | 42 |
| at 100% Elongation | 31 |
| at 200% Elongation | 10 |
| at 300% Elongation | 7 |

EXAMPLE 2

Cured Rubber Properties of Chitosan as Partial Filler Replacement for Carbon Black The prepared chitosan was used to partially replace carbon black in the model formulation. Chitosan, which was prepared as described in example 1, was used at 15 phr and 30 phr and carbon black was used at 30 phr and 15 phr, respectively, in the model recipe. Natural rubber prepared according to the formula, leaving out the chitosan, was used as the control.

The Instron results for the three composites show that the low strain moduli of the chitosan reinforced composites are equivalent to the control. However, there is an incremental decrease in Tan Delta at 60° C. in the chitosan composites, which correlates to a reduction in rolling resistance in a tire. Partial replacement of carbon black with chitosan in a tire would reduce the weight, and should reduce the rolling resistance of the tire.

| Material | 60° C. Tan Delta |
|---|---|
| Control | 0.67 |
| 15 phr Chitosan | 0.42 |
| 30 phr Chitosan | 0.30 |

EXAMPLE 3

Latex Blending of the Chitosan for Improved Mechanical Properties and a Finer Particle Size Latex Blending The following solutions were prepared:
1. 60 ml of 0.17 M acetic acid in water containing 11 g of chitosan.
2. 400 ml of SBR Latex copolymerized with metharcrylic acid (2%) having 64 g of elastomer by weight and 0.28 g of a mixture of alkylated and arylated phenols.
3. 400 ml of natural rubber (ammoniated and diluted) to contain 64 g of natural rubber and 0.28 g of a mixture of alkylated and arylated phenols.
4. Coagulating solution containing 6.4 g of sodium chloride and 8 g of aluminum sulfate and 0.52 g of alkyl ammonium quaternary salt.

A Waring blender was used for agitation and blending.

Procedure

The coagulating solution was heated to 70°-80° C. The chitosan solution was then added, and no precipitation was observed. The solution was put into a blender and agitated. The latex (either 2 or 3) was slowly dripped into the rapidly stirring solution in the blender. An aggregate of the chitosan/rubber was isolated. The sample was washed with base and dried. The chitosan/rubber material was added to the recipe on top of the 100 parts of elastomer. Brabender compounding using the model formulation followed the same conditions and procedures described in Example 1.

RESULTS

The latex NR/chitosan blend was observed under an electron microscope at 10,000 times magnification. Most of the particles observed were in the 3–4 micron range. There were, however, some particles as small as 0.5 microns, and some as large as 10–15 microns. These particles are much finer than can be obtained by conventional grinding in the Wiley mill.

Table I illustrates stress strain results comparing the natural rubber latex/chitosan blend with a control. The results show a 30%–35% increase in low strain moduli up to 200% elongation for the chitosan composite compared to the control. Only a modest increase in modulus at 300% elongation is observed. There is a 29% loss in ultimate tensile accompanied by a reasonable elongation of 400%. In the tables, Ult. El. is Ultimate Elongation.

TABLE I

CURED RUBBER PHYSICAL PROPERTIES OF LATEX BLENDS OF NATURAL RUBBER AND CHITOSAN

| LATEX BLENDS | MODULI (MPa) | | | | ULTIMATE TENSILE (MPa) | Ult El % |
|---|---|---|---|---|---|---|
| | 50% | 100% | 200% | 300% | | |
| NR CONTROL | 1.01 | 1.79 | 4.97 | 11.30 | 27.84 | 515 |
| NR/ CHITOSAN 17.6 phr | 1.35 | 2.42 | 6.31 | 11.95 | 19.71 | 410 |

EXAMPLE 4

Crude chitin containing less than 5% chitosan was commercially ground in a fluid energy model 6 inch axial microjet with compressed air to 100 psig. 68% of the biopolymer was reduced to less than 50 microns, and all particles were less than 75 microns in size. 50 grams of the biopolymer and 200 grams of natural rubber were processed in a micropressor equipped Brabender mixer (300cc capacity) set at 150° C. and mixed for 5 minutes. The drop temperature was 161° C. This polymer blend was compounded in the formulation described in example 1, using 100 phr elastomer and 25 phr crude chitin.

TABLE II

| Instron Testing | MODULI (MPa) | | | | |
|---|---|---|---|---|---|
| | 50% | 100% | 200% | 260% | 300% |
| Control NR | .92 | 2.12 | 5.58 | | 11.16 |
| NR/25 phr Chitin | 2.97 | 4.51 | 9.86 | 14.02 | |

EXAMPLE 5

Table III shows the comparative results of using chitin and chitosan in addition to the normal loading of carbon black. There is a significant increase in tensile moduli up to 300% elongation for both chitin and chitosan at 15 phr. However, the ultimate tensile is lower than the control in both cases. At high loadings of chitin and chitosan, the enhanced modulus drops off at 200% elongation.

The contribution of a reinforcing material in a compound is dependent on modulus as well as the volume of the system. Because chitosan has a lower density than carbon black, it has larger volume on a weight basis, and possibly could provide more reinforcement. These data indicate that the biopolymers may have utility in low strain tire applications.

A chitosan loaded natural rubber composite when loaded at 15 phr has a higher 300% modulus than a similar chitin loaded composite (15 phr). Also, the ultimate tensile of NR/chitosan is 12.5% higher than that of NR/chitin.

TABLE III
CURED RUBBER PROPERTIES OF CHITIN AND CHITOSAN AS ADJUNCT FILLERS WITH CARBON BLACK

| MATERIAL | MODULI (MPa) | | | | ULTIMATE TENSILE (MPa) | ULT EL % |
|---|---|---|---|---|---|---|
| | 50% | 100% | 200% | 300% | | |
| NR/ CONTROL | 1.21 | 2.06 | 5.83 | 11.48 | 24.68 | 500 |
| NR/CHITAN | | | | | | |
| +15 PHR | 2.03 | 3.06 | 6.37 | 10.01 | 16.75 | 362 |
| +30 PHR | 2.00 | 3.48 | 5.81 | 10.10 | 10.59 | 325 |
| +45 PHR | 2.06 | 2.80 | 5.27 | 9.33 | 9.67 | 310 |
| NR/CHITOSAN | | | | | | |
| +15 PHR | 1.73 | 2.70 | 6.39 | 12.24 | 18.85 | 400 |
| +30 PHR | 2.12 | 3.12 | 6.65 | 11.70 | 11.70 | 300 |
| +45 PHR | 1.95 | 2.54 | 5.95 | 9.49 | 9.74 | 305 |

EXAMPLE 6

Table IV shows the results of replacing part of the carbon black with chitin and chitosan. Both chitin and chitosan show similar results at 15 phr. Low strain moduli (<100% elongation) are similar to the control, however at break, there is about a 20% decrease in tensile strength using the biopolymers. At higher loading of biopolymers there is further decrease in tensile at break.

An isocyanate (1-(1-isocyanato-1-methylethyl)-3-(1-methylethenyl) benzene) was used in an attempt to surface-treat chitin and chitosan in order to introduce double bonds as possible sites for curing. The biopolymers were not analyzed for success of the reaction, but the chitosan treated with the isocyanate gave the best moduli observed, and the ultimate tensile was only 16% less than the control.

TABLE IV
CURED RUBBER TENSILE PROPERTIES OF CHITIN AND CHITOSAN AS PARTIAL FILLER REPLACEMENT FOR CARBON BLACK

| MATERIAL | MODULI (MPa) | | | | ULTIMATE TENSILE (MPa) | ULT EL % |
|---|---|---|---|---|---|---|
| | 50% | 100% | 200% | 300% | | |
| NR CONTROL | 1.20 | 2.20 | 6.03 | 11.80 | 26.64 | 511 |
| CHITIN: REPLACE | | | | | | |
| 15 PHR | 1.38 | 2.10 | 4.08 | 8.29 | 20.72 | 506 |
| 30 PHR | 1.33 | 1.70 | 2.58 | 4.07 | 15.22 | 603 |
| CHITOSAN: REPLACE | | | | | | |
| 15 PHR | 1.34 | 1.96 | 4.00 | 7.78 | 18.73 | 493 |
| 30 PHR | 1.19 | 1.64 | 2.86 | 4.64 | 12.74 | 484 |
| TREATED WITH ISOCYANATE CHITOSAN: | | | | | | |
| 15 PHR | 1.12 | 1.95 | 4.06 | 7.71 | 22.31 | 551 |
| CHITIN: | | | | | | |
| 15 PHR | 1.20 | 1.86 | 3.79 | 7.21 | 21.04 | 519 |

EXAMPLE 7

Modified Chitosan

In order to enhance curing reaction of powdered chitosan with rubber, chitosan was treated with an isocyanate (neat, room temperature, 48 hours) that also contains a double bond, having the formula:

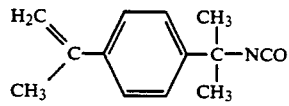

The propenyl double bond is available for crosslinking in the sulfur cure operation. (This compound can also be used in a peroxide cure, not shown in this example).

No analysis was performed on the treated powdered chitosan to determine the extent of reaction. The powdered chitosan was used to replace carbon black at 15 phr level in a formulation similar to that described in example I using natural rubber as the elastomer (ingredient I, 100 phr).

The results in Table V show an even greater percentage increase in low strain modulus for a similar level of chitosan reinforcement when using an SBR latex with polar groups (2% carboxylated) as the elastomer in the formula (100 phr) in place of cis 1, 4 polyisoprene. Compared to the control, there is a 72% and 54% increase in moduli at 50% and 100% elongation. Because this rubber has been carboxylated using methacrylic acid, there is potential for some interaction between the elastomer and the polar groups on the chitosan.

TABLE V
CURED RUBBER PHYSICAL PROPERTIES OF CHITOSAN AND CARBOXYLATED SBR LATEX BLENDS

| LATEX BLENDS | MODULI (MPa) | | | ULTIMATE TENSILE (MPa) | ULT EL % |
|---|---|---|---|---|---|
| | 50% | 100% | 200% | | |
| Carboxylated SBR Control | 2.86 | 4.82 | 8.07 | 8.63 | 220 |
| Carboxylated SBR/Chitosan 16.3 phr | 4.92 | 7.41 | 9.26 | 9.26 | 200 |

EXAMPLE 8

Table VI shows the results of the total replacement of carbon black with chitin and chitosan in the model formulation. The tensile moduli at 50% and 100% elongation are similar to the control, but they rapidly drop off at higher elongations.

It previously had been reported that chitin and chitosan show essentially identical, weakly reinforcing behavior when loaded into natural rubber, compared with a control with no carbon black.

TABLE VI

CURED RUBBER TENSILE PROPERTIES WITH CHITIN AND CHITOSAN AS TOTAL REPLACEMENT OF CARBON BLACK

| MATERIAL | MODULI MPa | | | | ULTIMATE TENSILE (MPa) | Ult E % |
|---|---|---|---|---|---|---|
| | 50% | 100% | 200% | 300% | | |
| NR/ CONTROL | 1.21 | 2.06 | 5.83 | 11.48 | 24.68 | 500 |
| CHITIN | | | | | | |
| 75 μ | 1.37 | 2.03 | 2.73 | 3.78 | 10.94 | 550 |
| 180 μ | 1.34 | 1.74 | 2.26 | 2.87 | 8.52 | 550 |
| CHITOSAN | | | | | | |
| 75 μ | 1.28 | 1.88 | 2.47 | 3.26 | 11.88 | 560 |
| 180 μ | 1.07 | 1.38 | 1.81 | 2.35 | 9.50 | 570 |

EXAMPLE 9

Table VII shows that cure times of the biopolymer-modified compounds are similar to the control. The replacement of 33% carbon black in the model recipe (Example 1) reduces the tan delta at 60° C., which may lead to a reduction in rolling resistance.

TABLE VII

CURE RHEOMETRY AND TAN δ OF CHITIN AND CHITOSAN FILLER REPLACEMENT FOR CARBON BLACK

| MATERIAL | T2 | T25 | T90 | 60° C. TAN δ | 0° C. TAN δ |
|---|---|---|---|---|---|
| NR CONTROL | 4.4 | 5.1 | 8.0 | 0.67 | 0.96 |
| CHITIN: | | | | | |
| 15 PHR | 4.4 | 5.4 | 8.4 | 0.42 | 0.83 |
| 30 PHR | 6.0 | 7.0 | 10.2 | 0.30 | 0.67 |
| CHITIN: | | | | | |
| ISOCYANATE TREATED CHITOSAN: | 4.9 | 6.0 | 9.3 | 0.53 | 0.93 |
| 15 PHR | 4.2 | 5.4 | 8.0 | 0.42 | 0.83 |
| 30 PHR | 4.7 | 5.5 | 8.3 | 0.35 | 0.70 |
| CHITOSAN: | | | | | |
| ISOCYANATE TREATED | 4.5 | 5.5 | 8.4 | 0.52 | 0.92 |

Figure 2:
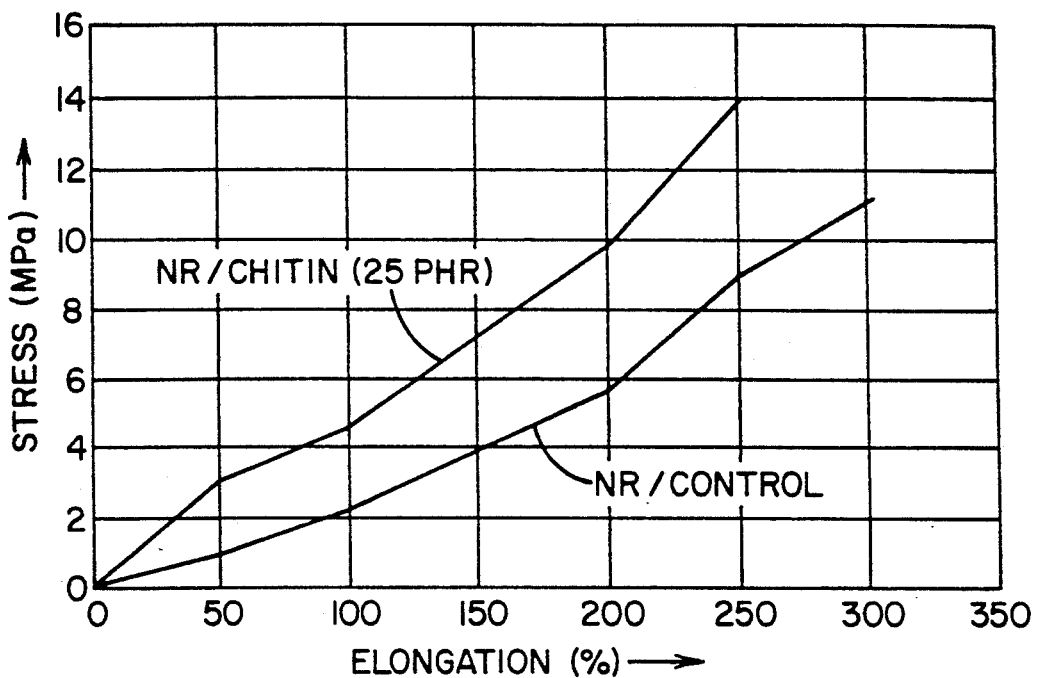
FIG. 2 is a graph illustrating the stress/strain properties of biopolymer reinforced composites as compared to a control.

FIG. 2 illustrates the effect of chitin pre-mixed in the Brabender at 20% loading and compounded into the model formulation. The low strain moduli are visibly enhanced when chitin is mixed in this manner.

Figure 3:
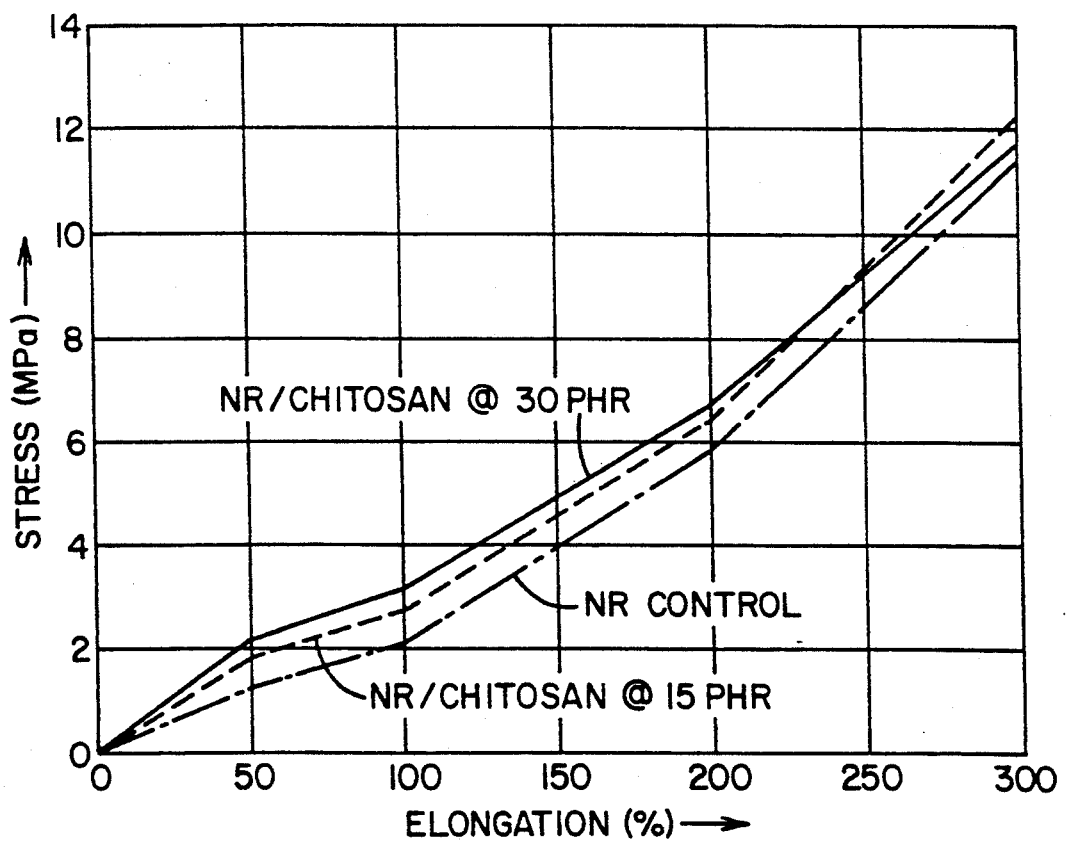
FIG. 3 illustrates the stress/strain properties of chitosan reinforced natural rubber as compared to a natural rubber control.

FIG. 3 illustrates the effect of chitosan on stress/strain properties by comparing a natural rubber control with natural rubber reinforced with 15 phr chitosan and natural rubber reinforced with 30 phr chitosan.

Figure 4:
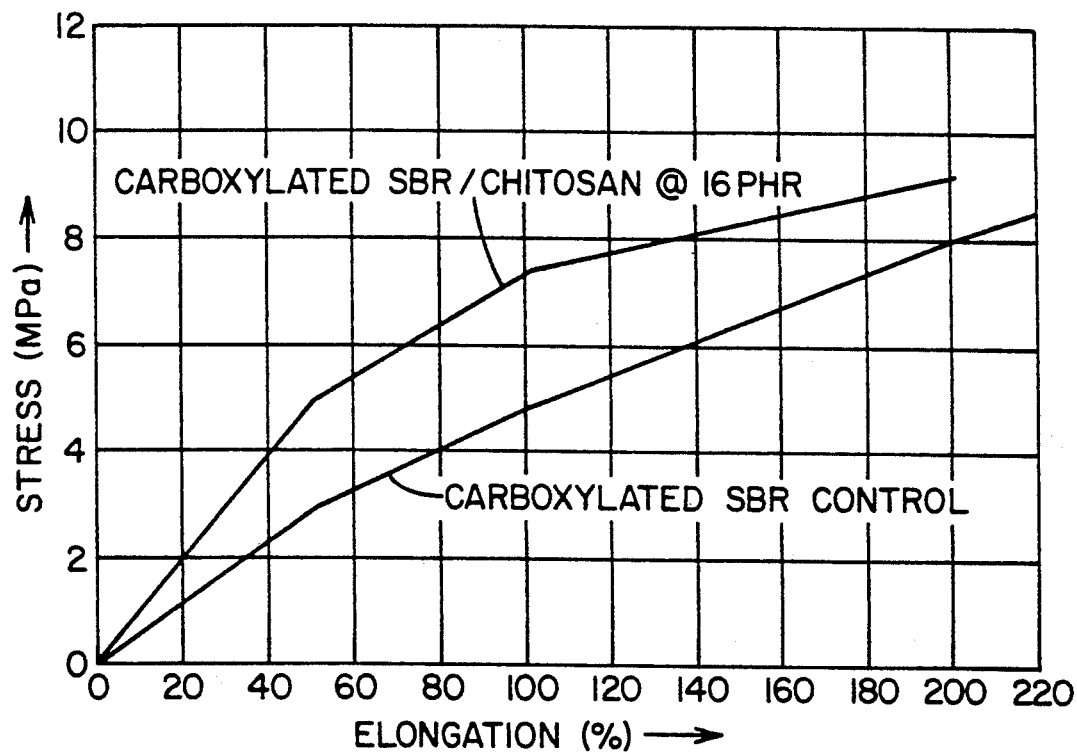
FIG. 4 illustrates the stress/strain properties of carboxylated SBR wherein chitosan is incorporated using the latex blending technique.

FIG. 4 illustrates the effect of fine chitosan particles (incorporated into the elastomer using the latex blending technique) on stress properties in carboxylated SBR.

From the data obtained, the following conclusions can be reached.

1. Chitin and chitosan do not significantly affect the normal sulfur cure behavior of elastomers.
2. Use of chitin and chitosan in addition to carbon black (15 phr) result in enhancement of modulus at low strains with little change from the control at high strains.
3. Chitin and chitosan used as partial replacement of (in place of) carbon black (15 and 30 phr ipo) gave low strain moduli equivalent to the control.
4. Replacement of carbon black with chitosan (15 phr ipo) reduces the tan delta at 60° C., which may lead to a reduction in rolling resistance.
5. Complete replacement of carbon black with chitosan gives vulcanizates with low strain moduli equivalent to the control; however, the high strain moduli are significantly decreased. 6. Use of finer chitosan particles (prepared using latex blending) enhances the reinforcement properties of chitosan and improves the stress/strain properties achieved.

While specific embodiments of the invention have been described and illustrated, those skilled in the art will recognize that the invention may be variously modified and practiced without departing from the spirit of the invention. The invention is limited only by the following claims.

What is claimed is:

1. A reinforced elastomeric article comprising an elastomeric matrix and 5 to 30 phr chitosan particles having a diameter of 0.5 to 15 microns and a medium particle size of about 3–4 microns.

2. A reinforced elastomeric article comprising an elastomeric matrix and 5 to 30 phr modified chitosan particles having a diameter of 0.5 to 75 microns, wherein a chitosan modifier comprises an oxygen reactive group or a nitrogen reactive group.

3. The reinforced elastomeric article of claim 2 in which said chitosan particles have a diameter of 0.5 to 15 microns and a median particle size of about 3–4 microns.

4. The article of claim 2 wherein an oxygen modifier is selected from the group consisting of acid anhydrides, alkylhalides, and an isocyanate, and a nitrogen modifier is selected from the group consisting of isocyanates and epoxides.

5. A tire having a reinforced tire component comprising an elastomeric matrix and 5 to 30 phr chitosan particles having a diameter of 0.5 to 75 microns.

6. The tire of claim 5 in which said chitosan particles have a diameter of 0.5 to 15 microns and a median particle size of about 3.4 microns.

7. A tire having a reinforced tire component comprising an elastomeric matrix and 5 to 30 phr modified chitosan particles having a diameter of 0.5 to 75 microns, wherein a chitosan modifier comprises an oxygen reactive group or a nitrogen reactive group.

8. The tire of claim 7 in which said chitosan particles have a diameter of 0.5 to 15 microns and a median particle size of about 3.4 microns.

9. The tire of claim 7 wherein an oxygen modifier is selected from the group consisting of acid anhydrides, alkylhalides, and isocyanates, and a nitrogen modifier is selected from the group consisting of isocyanates and epoxides.

10. A method of mixing chitosan into an elastomer comprising the steps of
   (a) dissolving chitosan in weak acid
   (b) preparing a latex solution of an elastomer
   (c) preparing a coagulating solution adapted to coagulate said latex, and
   (d) mixing said chitosan, said coagulating solution and said latex thereby incorporating chitosan fibers in said elastomer.

11. The method of claim 10 comprising the further steps of mixing said elastomer containing chitosan with more elastomer.

12. The method of claim 10 wherein said mixing step further comprises.
   (a) combining the chitosan containing solution and the coagulating solution;
   (b) dripping the latex solution into the coagulating solution; and
   (c) isolating a precipitated chitosan/rubber.

13. A reinforced elastomer comprising an elastomeric matrix and 5 to 30 phr chitosan particles having a diameter of 0.5 to 15 microns and a median particle size of about 3-4 microns.

14. A reinforced elastomer comprising an elastomeric matrix and 5 to 30 phr modified chitosan particles having a diameter of 0.5 to 75 microns, wherein a chitosan modifier comprises an oxygen reactive group or a nitrogen reactive group.

15. The reinforced elastomer of claim 14 in which said chitosan particles have a diameter of 0.5 to 15 microns and a median particle size of about 3.4 microns.

16. The elastomer of claim 14 wherein an oxygen modifier is selected from the group consisting of acid anhydrides, alkylhalides and isocyanates, and a nitrogen modifier is selected from the group consisting isocyanates and epoxides.

* * * * *